Viscoelasticity of Copolymer in Example 3

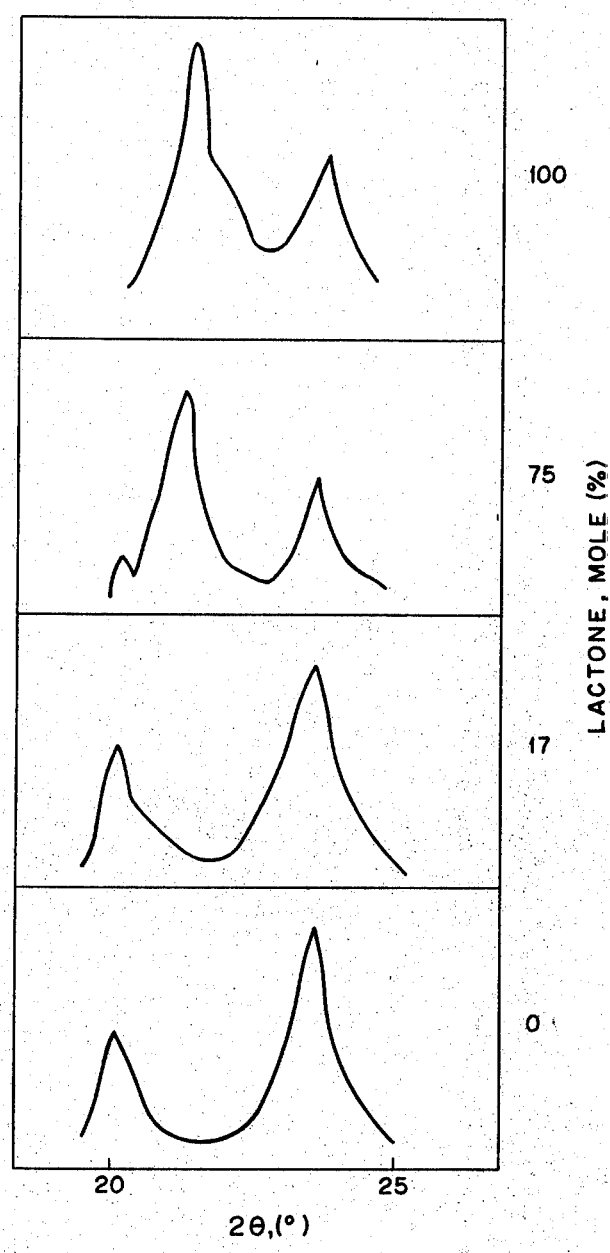
X-ray Diffraction Patterns of Copolymers of ε-caprolactam and ε-caprolactone in Examples 4, 7, 8 and 9

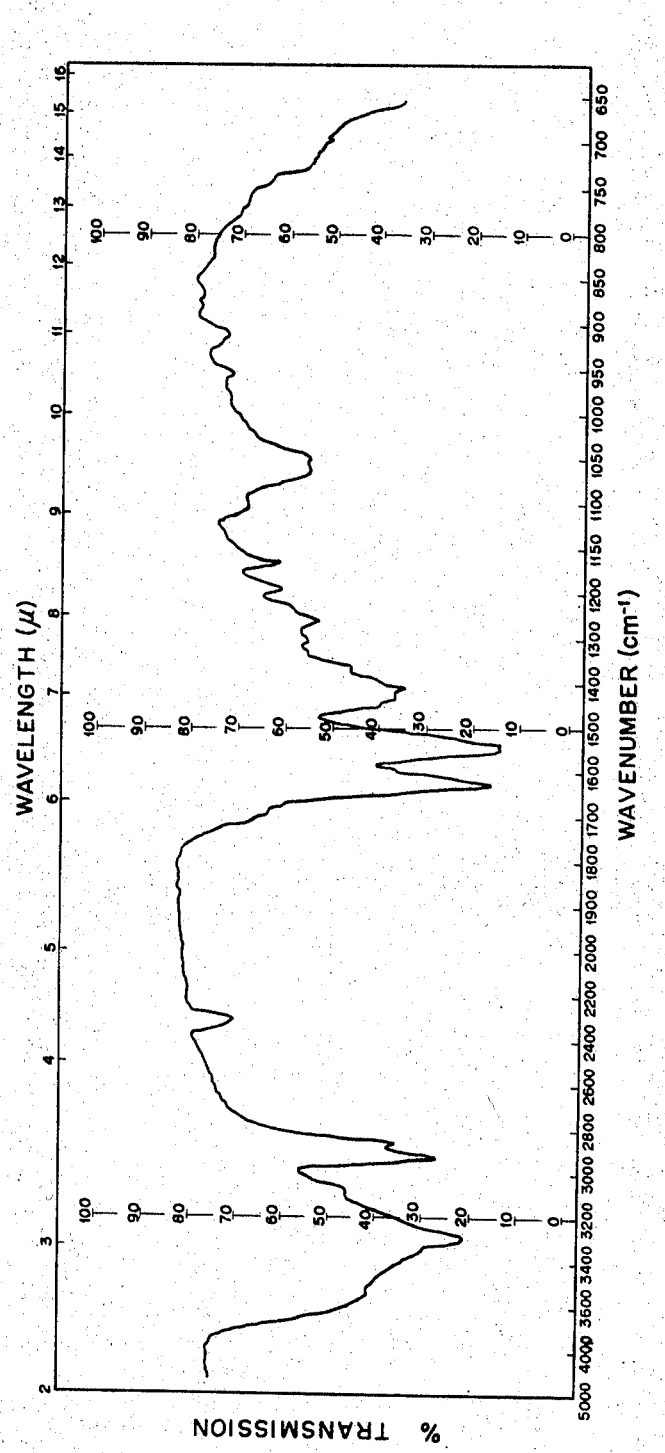

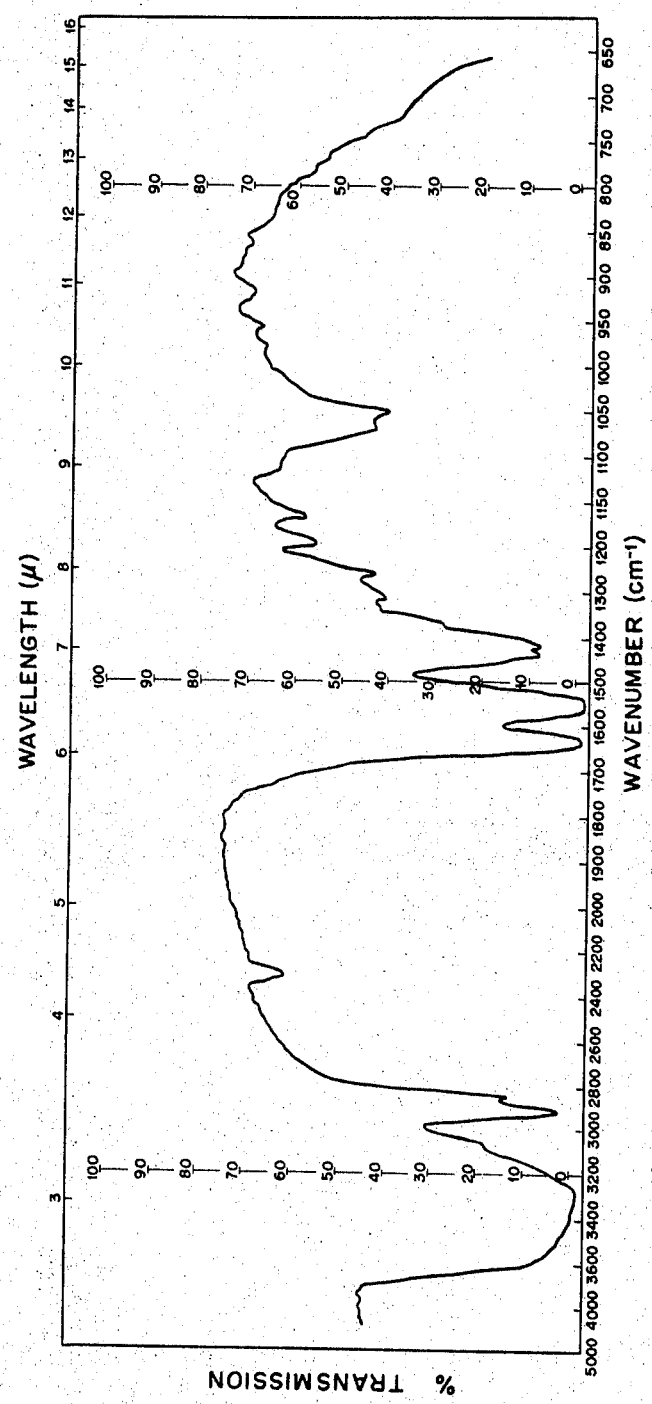

United States Patent Office 3,558,568
Patented Jan. 26, 1971

3,558,568
PRODUCTION OF LACTAM-LACTONE COPOLYMERS
Hidehiko Kobayashi, Tokyo, Hiroshi Komoto, Iruma-gun, and Shinichi Ishida, Tokyo, Japan, assignors to Asahi Kasei Kogyo Kabushiki Kaisha, Osaka, Japan, a corporation of Japan
Filed June 19, 1967, Ser. No. 646,905
Claims priority, application Japan, June 22, 1966, 41/40,040, 41/40,043
Int. Cl. C08g 20/18
U.S. Cl. 260—78
13 Claims

ABSTRACT OF THE DISCLOSURE

The copolymerization of at least one lactam with at least one lactone at temperatures of about 20 to 250° C. in the presence of alkali metal, magnesium or derivatives of either as initiators. The lactams should have at least 4 carbon atoms in the ring and the lactones at least about 3 carbon atoms in the ring. A solvent, such as aliphatic, aromatic, alicyclic hydrocarbons or cyclic ethers may be used. The alkali metal, magnesium or derivatives thereof, initiators may be in the form of their reaction products with lactam or lactam-lactone mixtures.

---

The copolymers of this invention are suitable for use in the production of fibers, films, sheets, adhesives, paint vehicles, other shaped objects and as a component of polymer blends.

This invention relates to the production of lactam-lactone copolymers.

Lactams and lactones are both known materials which are well known polymerization reactants from which polyamides, such as nylon 6 and homopolyesters, can be produced. It is also known that copolyester amides can be produced by several techniques, including the reaction of amino alcohols with dicarboxylic acids or their anhydrides. Further, these materials can be produced by the reaction of amide-forming or -containing materials, such as lactams, amino-carboxylic acids, nylon salts, etc. with ester-containing or -forming materials, such as lactones, hydroxy carboxylic acids, low molecular weight esters of polycarboxylic acids, etc. in a polycondensation reaction.

It has been the practice in the past to carry out this known polycondensation reaction at high temperatures under high vacuum, so that the reaction was strongly driven toward polymerization with the by-product water-condensation product being continually and strongly removed from the reaction mixture. While this process has been operative to produce copolyester amide products, it has suffered from the disadvantage that at the high polymerization temperatures and high vacuum used, the amide and ester groups formed or present have had a tendency to react with each other and thereby to form a product which tends to introduce discoloration into the final copolymer product.

As will be appreciated by the art, polymeric products which are not substantially uniform in color and are not preferably as white as possible, have an inferior market standing and suffer from an economic competitive disadvantage.

One object of this invention is the copolymerization of lactams and lactones which avoid the prior art difficulties.

Another object of this invention is a process for the production of copolyester amides.

It is another object of this invention to provide a novel process for copolymerizing lactams and lactones.

It is a further object of this invention to provide a novel initiator for the copolymerization of lactams and lactones.

It is still another object of this invention to provide novel copolyester amides.

Other and additional objects of this invention will become apparent from a consideration of this entire specification including the claims hereof.

In accord with and fulfilling these objects, one aspect of this invention resides in the copolymerization of at least one lactam with at least one lactone, at a temperature of about 20 to 250° C. and preferably about 40 to 180° C., utilizing as the polymerization initiator at least one member selected from the group consisting of alkali metals, magnesium and derivatives thereof.

According to this invention, the lactam reactant preferably contains at least about 4 carbon atoms in the ring. The lactam further preferably contains only nitrogens in the ring as are bound in amide linkages. While there is no particular upper limit on the number of carbon atoms in the lactam ring, for practical purposes, it has been found that rings containing up to about 12 carbon atoms are most suitable for use herein. It is within the scope of this invention to utilize ω-lactams or lactams having substituent groups pendant from the N-bonded ring carbon atom. Similarly, the lactam may have substituents on other ring carbon atoms. These ring carbon substituents should be generally inert with respect to the polymerization reaction conditions and should not interfere with the lactam ring cleavage or subsequent linear polymerization reaction of the cleaved ring. Suitably such substituents as alkyl, aryl, alkoxy, aryloxy, alkaryl, aralkyl and the like, containing up to about 8 carbon atoms in the alkyl groups and up to about 12 carbon atoms in the aryl groups containing one or more rings, which adhere to the general conditions set forth above, are permissive. Examplary lactams include α-pyrrolidone, ε-caprolactam, ω-heptalactam, ω-lauryl lactam, etc. The preferred lactam is ε-caprolactam. It is within the scope of this invention to utilize two or more different lactam reactants simultaneously and thereby to form a higher than two-component polymer product.

According to this invention, the lactone reactant preferably contains at least about 3 carbon atoms in the ring. While there is no particular upper limit upon the number of carbon atoms in the lactone ring, for practical purposes it has been found that rings containing up to about 12 carbon atoms are most suitable for use herein. It is within the scope of this invention to utilize ω-lactones or lactones having substituent groups pendant from the O-bonded ring carbon atom. Similarly, the lactone may have substituents on other ring carbon atoms. These ring carbon substituents should be generally inert with respect to the polymerization reaction conditions and should not interfere with the lactone ring cleavage or subsequent linear polymerization reaction of the cleaved ring. Suitably such substituents as alkyl, aryl, alkoxy, aryloxy, alkaryl, aralkyl, and the like, containing up to about 8 carbon atoms in the alkyl groups and up to about 12 carbon atoms in the aryl groups containing one or more rings which adhere to the general conditions set forth above, are permissive. Exemplary lactones include pivalolactone, δ-valerolactone, ε-caprolactone, monomethyl valerolactone, etc. The preferred lactone is ε-caprolactone. It is within the scope of this invention to utilize two or more different lactone reactants simultaneously and thereby to form a higher than two-component polymer.

Should lactones and/or lactams be used in the practice of this invention which have substituents on the ring carbon atoms thereof, such substituents should not be reactive with the other polymer precursor reactant nor with the initiator or any promotor which may be employed.

The polymerization initiators according to this invention are the alkali metals, magnesium, and derivatives thereof. The alkali metals are exemplified by lithium, sodium potassium, rubidium and cesium. It is within the purview of this invention to add the initiator metal to the polymerization reaction mixture, either in metallic form or as a simple derivative, such as for example a hydride, hydroxide, carbonate, alcoholate, phenolate, organo-metallic compound, including Grignard reagents, or as the reaction product of the metal or derivative of such metal, with a lactam, preferably one of the lactam reactants. Specifically exemplary initiators include lithium, potassium, sodium, cesium, rubidium, lithium hydride, sodium hydride, sodium hydroxide, potassium carbonate, lithium carbonate, sodium methoxide, sodium phenoxide, lithium propoxide, potassium butoxide, phenylsodium, butyllithium, sodium naphthalene, lithium naphthalene, stilbene dilithium, benzophenone sodium, 3-n-propylpyridylsodium, 3 - ethylpyridyl potassium, magnesium, dipropylmagnesium, diphenylmagnesium, phenylmagnesium bromide, propylmagnesium bromide, methylmagnesium bromide, methylmagnesium iodide, magnesium methoxide, magnesium isopropoxide, magnesium anilide and diethylamine Grignard reagent complexes.

In the course of the polymerization reaction described herein, utilizing the iniators described above, there have been recovered and isolated a novel group of organometallic compounds which can be categorized as lactam-lactone oligomer-metal intercompounds. These compounds correspond to the general formula:

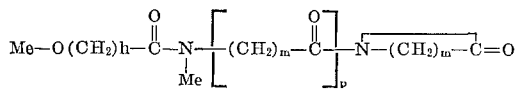

wherein Me is the alkali metal or magnesium metal component of the initiator originally added, $h$ is the number of non-carbonyl ring carbon atoms of the lactone reactant, $m$ is the number of non-carbonyl ring carbon atoms of the lactam reactant and $p$ is a whole number of at least about 1, preferably up to about 12.

It has been discovered that these metal oligomeric compounds are themselves excellent initiators for lactone-lactam copolymerization and can in fact be independently prepared and then subsequently used to initiate this copolymerization reaction.

It has been found valuable to introduce the initiator in proportion of about 0.05 to 5 mol percent, based upon the lactam reactant. It is preferred to employ about 0.1 to 2 mol percent initiator on the same basis.

The initiators of this invention can be employed alone or, if desired, together with a known promoter such as carboxylic acid esters, carbon dioxide, isocyanates, N-acyllactams, acylamino acid esters, carbamides, organic carboxylic acid chlorides, dicarboxylic acid imides, carbodiimides. The amount of the promoter can be varied from about 0.001 up to 2 mol percent, based on the lactam and preferably from about 0.001 to 0.5 mol percent.

While solvents are not required, the copolymerization may be carried out in the presence of at least one inert solvent. Examples of suitable solvents include aliphatic hydrocarbons, such as hexane, octane, light oil, kerosene; alicyclic hydrocarbons, such as cyclohexane, decaline; aromatic hydrocarbons, such as toluene, xylene, benzene; cyclic ethers, such as dioxane, tetrahydrofuran; and others such as diethyleneglycol dimethylether.

These solvents are preferably present in such amounts as to provide a weight ratio of about 10 to 2000 thereof with respect to the lactam reactant, and 10 to 2000 with respect to the lactone reactant.

It will be appreciated that in the practice of the process of this invention, the absolute reaction conditions chosen will depend, for optimum results, upon a consideration of the particular reactants being used. Thus, for example, the polymerization temperature which will result in optimum production of a copolymer of ε-caprolactam and ε-caprolactone will not necessarily result in optimum production of a copolymer of, for example, ε-caprolactam and δ-valerolactone. In the particular case of the copolymerization of ε-caprolactam and δ-valerolactone, it has been found that relatively high reaction temperatures are most desirable, e.g. about 150 to 180° C.

The copolymers obtained according to this invention are preferably extracted with a solvent, such as benzene, toluene, xylene, which dissolves the minor quantities of lactone homopolymers which may be present in the copolymer product. If the copolymerization according to this invention is conducted in these kinds of solvents, copolymers may be obtained directly in a high purity since any homopolymer will remain dissolved in the reaction solvent. The compositions of the copolymers may be measured by elemental analysis. When the melting points of the copolymers are plotted against the content of lactams and lactones, the plots of the melting points fall on lines, not on U-shaped curves which show random copolymers.

The lactam-lactone copolymers containing less than about 10 weight percent of lactone units are soluble only in solvents which are normally used for polyamides, while those containing 10 to 50 weight percent of lactone units are soluble in dimethylformamide and dimethylsulfoxide at 50° C. as well as in conventional polyamide solvents. Those copolymers containing more than 50 weight percent of lactone units are soluble in hot methanol. The copolymers produced according to this invention are novel and have 3 X-ray diffraction patterns at $2\theta=23-24°$, $2\theta=20.5-21.5°$ and $2\theta=19.5-20.5°$ and do not have a distinguishable maximum when temperatures are plotted against the mechanical loss factors ($=\tan \delta$) in viscoelastic properties. These copolymers are not completely random copolymers.

The copolymers of this invention are used in many fields and are suitable for the production of fibers, films, sheets, adhesives, paint vehicles, other shaped objects, and for a component of polymer blends.

BRIEF DESCRIPTION OF THE DRAWING

FIG. 2 shows X-ray diffraction patterns of ε-caprolactam-ε-caprolactone copolymers in Examples 4, 7, 8 and 9. FIG. 3 shows infrared absorption spectrum of the film of ε-caprolactam-ε-caprolactone copolymer in Example 4. FIG. 4 shows infrared absorption spectrum of the film of ε-caprolactam-ε-caprolactone in Example 7.

Figure 1:
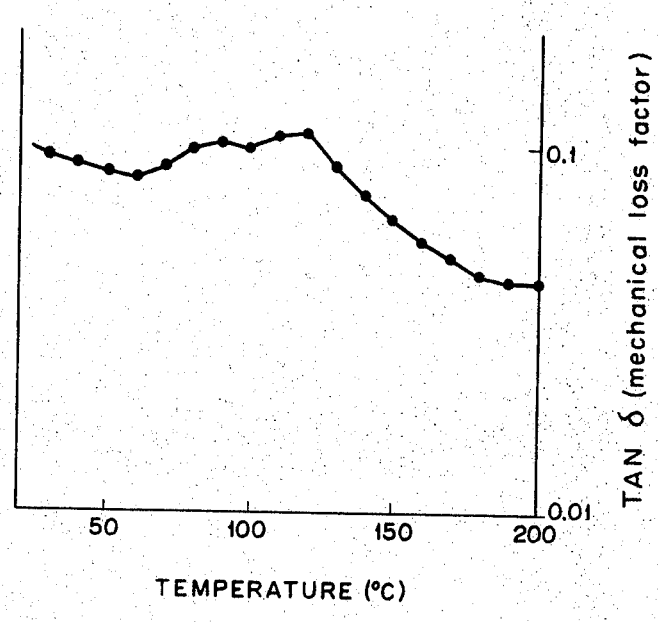
FIG. 1 shows viscoelasticity of ε-caprolactam-ε-caprolactone copolymer in Example 3.

This invention will be illustrated by the following examples which are in no way limiting upon the scope hereof. Parts and percentages are by weight and viscosities are intrinsic viscosities[η] measured as a 0.5 percent solution in m-cresol at 25° C. unless expressly stated to the contrary.

EXAMPLES 1 TO 9

To 50 parts of xylene there was added 1.15 parts of sodium metal and then to the obtained mixture there was added dropwise at 90° C. in a dry nitrogen atmosphere, with stirring, 60 parts of a xylene solution containing 5.56 parts of ε-caprolactam. The resultant mixture was permitted to stand as is for 3 hours. Then 2.79 parts of ε-caprolactone was added dropwise thereto and the reaction mixture maintained at 138° C. for 3 hours. A mixture of ε-caprolactam and ε-caprolactone (100 parts) having a desired composition was added to the resulting reaction mixture and the reaction was maintained in a nitrogen atmosphere at 138° C. with stirring for an additional 5 hours to produce a solidified reaction mixture. This reaction mixture was dissolved in m-cresol and precipitated by the addition of acetone thereto. A homopolyester was extracted from the precipitated mixture by refluxing for 3 hours with benzene, and the remaining copolymer was dried at 60° C. for 3 hours under a pressure of 1 mm. Hg absolute with the results shown in Table I. It was found by elemental analysis that the lactone contents in the copolymers were substantially equal to those in the starting compositions.

TABLE I

| Example: | Fed caprolactam, mol. percent | Fed caprolactone, mol. percent | Yield, percent | Melting point, °C. | ($\eta$) | Solubility | |
|---|---|---|---|---|---|---|---|
| | | | | | | Dimethyl-formamide | Ethanol |
| 1 | 97 | 3 | 94.6 | 222 | 1.25 | | |
| 2 | 95 | 5 | 97.3 | 218 | 1.37 | | |
| 3 | 90 | 10 | 98.2 | 202 | 1.48 | + | |
| 4 | 83 | 17 | 97.4 | 191 | 1.06 | + | |
| 5 | 75 | 25 | 96.4 | 170 | 1.17 | + | |
| 6 | 50 | 50 | 95.3 | 128 | 0.80 | ++ | |
| 7 | 25 | 75 | 80.0 | 63 | 0.65 | ++ | + |
| 8 | 100 | 0 | 93.2 | 215 | 1.10 | | |
| 9 | 0 | 100 | 92.0 | 50 | 0.45 | ++ | + |

NOTE.—+ Means dissolving under heating; ++ Means dissolving by conventional method.

EXAMPLE 10

To 22.6 parts of ε-caprolactam, there was added 0.9 part of sodium metal, and the obtained mixture was heated to a temperature of between about 90 and 90° C. to produce sodium caprolactam. While keeping the temperature at 110° C., 22.8 parts of ε-caprolactone was added to the resulting mixture, and the reaction was continued for 5 hours. The solidified polymer thus produced was treated in the same manner as in Examples 1 to 9 to give 43 parts of a copolymer having a melting point of 128° C. and a ($\eta$) of 0.80. The presence of amide groups and ester carbonyl groups in the polymer was observed by infra-red analysis.

*Elementary analysis.*—Calcd. (percent): N, 6.16. Found (percent): N, 6.40.

EXAMPLE 11

In 100 parts of toluene, there was dissolved 22.6 parts of ε-caprolactam, and to be obtained mixture there was added 0.2 part of phenylmagnesium bromide under refluxing. After adding 5.65 parts of ε-caprolactone thereto, the reaction was continued at 110° C. for 4 hours. The precipitated polymer powder was dried to give 22.5 parts of a copolymer having a melting point of 173° C.

*Elementary analysis.*—Calcd. (percent): N, 9.24. Found (percent): N, 9.25.

EXAMPLE 12

There was simultaneously placed in a three-necked flask 22.6 parts of ε-caprolactam, 0.14 part of sodium metal and 5.65 parts of ε-caprolactone, and the reaction mixture brought to 110° C. and held there for 4 hours in a nitrogen atmosphere to produce a solidified reaction mixture. This solid product was treated in the same manner as in Examples 1 to 9 to give 22 parts of a copolymer having a melting point of 170° C.

*Elementary analysis.*—Calcd. (percent): N, 9.24. Found (percent): N, 9.34.

EXAMPLES 13 TO 18

There was placed in a flask 170 parts of α-pyrrolidone which was heated to 140° C. for 10 minutes in a nitrogen atmosphere. After eliminating water and cooling, 1.38 parts of sodium hydride was added, and then the desired amount by weight of ε-caprolactone was added thereto.

The reaction was continued at 140° C. for 6 hours with stirring. After the reaction was completed, the solidified reaction product was pulverized and extracted with benzene under refluxing. The fed comonomer composition, the melting point, the viscosity, the solubility of the resulting polymers, and the content of the lactone in the resulting copolymers are shown in Table II.

TABLE II

| Example | Fed ε-caprolactone, mol. percent | Yield, percent | Melting point °C. | ($\eta$) | ε-caprolactone, mol. percent | Solubility | |
|---|---|---|---|---|---|---|---|
| | | | | | | Dimethyl-formamide | Methanol |
| 13 | 0 | 40 | 265 | 0.30 | 0 | | |
| 14 | 4 | 94.0 | 250 | 1.38 | 12 | | |
| 15 | 9 | 94.2 | 235 | 1.28 | 20 | + | |
| 16 | 23 | 95.3 | 215 | 1.35 | 25 | + | |
| 17 | 48 | 70.5 | 189 | 0.93 | 30 | ++ | |
| 18 | 75 | 68.0 | 128 | 0.75 | 50 | ++ | + |

NOTE.—+ Means dissolving under heating. ++ Means dissolving by conventional method.

EXAMPLES 19 TO 23

The following examples were run in the same manner as Examples 19 to 23, except that δ-valerolactone was employed in place of ε-caprolactone with the following results shown in Table III.

TABLE III

| Example | Fed δ-valerolactone, mol. percent | Yield, percent | Melting point, °C. | ($\eta$) | δ-valerolactone, mol. percent | Solubility | |
|---|---|---|---|---|---|---|---|
| | | | | | | Dimethyl-formamide | Methanol |
| 19 | 3 | 94.1 | 236 | 1.37 | 13 | | |
| 20 | 10 | 94.7 | 226 | 1.42 | 22 | + | |
| 21 | 30 | 85.1 | 188 | 1.10 | 46 | + | |
| 22 | 50 | 81.4 | 159 | 0.65 | 55 | ++ | + |
| 23 | 75 | 78.5 | 75 | 0.52 | 76 | ++ | + |

NOTE.—+ Means dissolving under heat; ++ Means dissolving by conventional method.

EXAMPLES 24 TO 30

To 100 parts of xylene there was added 8 parts of ε-caprolactam and then 1 mole percent of the following initiator based on the lactam was added thereto. After heating the resulting mixture at 130° C. there was added thereto 2 parts of ε-caprolactone. The reaction was continued further for 5 hours and the resulting polymer powder was separated, extracted with 0.1 N-methanolic hydrochloric acid solution, then washed with water and dried under vacuum (1 mm. Hg.) at 40° C. with the following results shown in Table IV.

TABLE IV

| | Initiator | Yield, percent | ($\eta$) | Melting point, °C. |
|---|---|---|---|---|
| Example: | | | | |
| 24 | Sodium hydride | 97 | 1.32 | 185 |
| 25 | Sodium methoxide | 96 | 1.34 | 186 |
| 26 | Lithium metal, dispersion | 95 | 1.41 | 185 |
| 27 | n-butyl lithium | 95 | 1.39 | 185 |
| 28 | Potassium | 90 | 1.02 | 184 |
| 29 | Potassium hydroxide | 90 | 0.87 | 183 |
| 30 | Magnesium methoxide | 90 | 0.77 | 185 |

EXAMPLE 31

To 50 parts of xylene, there was added 1.15 parts of sodium metal, and then to the obtained mixture there was added dropwise at 90° C. in a nitrogen atmosphere with stirring 60 parts of a xylene solution containing 5.56 parts of ε-caprolactam. Subsequently, 3.0 parts of pivalolactone was added dropwise to the resulting mixture and the obtained mixture was heated for 3 hours at 130° C. After adding a further 300 parts of a 30 weight percent xylene solution containing a mixture of ε-caprolactam and pivalolactone at a weight ratio of 1 to 1 with stirring to the resulting reaction mixture, the reaction was continued at 135 C. for 5 hours. The obtained reaction mixture was treated in the same manner as in Example 1 to give a copolymer having a melting point of 220° C. and a ($\eta$) of 1.21 in a yield of 92%.

EXAMPLE 32

To 100 parts of a mixture of kerosene and xylene in a weight ratio of 50 to 50, there was added 10 parts of ε-caprolactam and then to the obtained mixture, there was added 0.1 part of phenylmagnesium bromide, and the resulting mixture was maintained at 130° C. for 3 hours. After adding 300 parts of a 30 weight percent xylene solution containing a mixture of ε-caprolactam, ε-caprolactone and pivalolactone in a weight ratio of 3:1:1 respectively to the resulting reaction mixture with stirring, the reaction was continued at 130° C. for 4 hours. Then the resulting reaction mixture was treated in the same manner as in Example 1 to give a white powdered copolymer having a melting point of 195° C., a ($\eta$) of 0.82 and a yield of 94%.

EXAMPLE 33

In a three-necked flask, there was simultaneously placed 22.6 parts of ε-caprolactam, 0.14 part of sodium metal and 0.12 part of N-acetyl caprolactam and 5.65 parts of ε-caprolactone. The reaction was continued at 110° C. for 3 hours in a nitrogen atmosphere to give a solidified reaction mixture, which was treated in the same manner as in Examples 1 to 9 to give 21 parts of a copolymer having a melting point of 173° C.

*Elemental analysis.*—Calcd. (percent): N, 9.4. Found (percent): N, 9.50.

EXAMPLE 34

In a three-necked flask there was simultaneously placed 22.6 parts of ε-caprolactam, 0.2 part of phenylmagnesium-bromide and 0.1 part of N-methylphthalimide and 20 parts of pivalolactone. The reaction was continued at 110° C. for 3 hours in a nitrogen atmosphere to give a solidified reaction mixture, which was treated in the same manner as in Examples 1 to 9 to give 26 parts of a copolymer having a melting point of 219° C.

EXAMPLES 35 AND 36

In a manner as set forth in Example 34, caprolactam, caprolactone and heptalactam are copolymerized. Similarly, caprolactam, heptalactam, caprolactone and pivalolactone are copolymerized.

It is known in the art to rapidly homopolymerize a lactam using an alkali metal salt of a lactam as the initiator. It is further known to employ lactones as acetylating agents in this polymerization. This reaction generally utilizes an alkali metal catalyst in the presence of an N-acetyl lactam. It is also known to homopolymerize lactones using alkali metal alcoholate initiators to produce hydroxyl terminated polyesters.

However, these prior art uses should not be confused with the copolymerization with described initiators as set forth herein.

What is claimed is:

1. Process for the production of fiber or film forming polyesteramides which comprises copolymerizing 3 to 75 mols per 100 mols of monomer, a lactone having at least 3 carbon atoms in a ring with 25 to 97 mols per 100 mols of monomer, a lactam having at least 4 carbon atoms and only amide bound nitrogen in the ring in the presence of an initiating amount of at least one initiator selected from the group consisting of lithium, sodium, potassium, rubidium and cesium; alkali metal compounds selected from the group consisting of hydrides, hydroxides, carbonates, alcoholates, phenolates, alkoxides of 1 to 4 carbon atoms, phenoxides of said alkali metals, phenyl sodium, butyllithium, sodium naphthalene, lithium naphthalene, stilbene dilithium, benzophenone sodium, 3-n-propylpyridylsodium and 3-ethylpyridyl potassium; magnesium; magnesium compounds selected from the group consisting of dipropylmagnesium, diphenylmagnesium, magnesium alkoxides of 1 to 3 carbon atoms, Grignard reagents, magnesium anilide and diethylamine-Grignard reagent complexes; and reaction products of said alkali metals, said alkali metal compounds, magnesium or said magnesium compounds with lactams or lactam-lactone mixtures, represented by a general formula

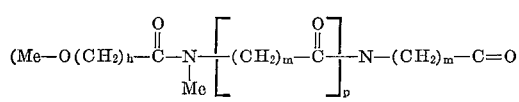

wherein Me is a member selected from the group consisting of said alkali metals and magnesium, $h$ is the number of non-carbonyl ring carbon atoms of the lactone reactant, $m$ is the number of non-carbonyl ring carbon atoms of the lactam reactant, and $p$ is a whole number of at least about 1 at a temperature of about 20 to 250° C. for a time sufficient to produce a copolyesteramide; and recovering said copolyesteramide.

2. Process as claimed in claim 1 wherein said initiator is present in an amount of about 0.05 to 5 mole percent based upon said lactam.

3. Process as claimed in claim 1 wherein said process is carried out at about 40 to 180° C. and said initiator is present in a proportion of about 0.1 to 2 mole percent based on said lactam.

4. A process according to claim 1 wherein said lactone is at least one member selected from the group consisting of pivalolactone, δ-valerolactone, monomethylvalerolactone, and ε-caprolactone.

5. A process according to claim 1 wherein said lactam is at least one member selected from the group consisting of a α-pyrrolidone, ε-caprolactam, ω-heptalactam and ω-lauryllactam.

6. A process according to claim 1 wherein the copolymerization is carried out in an inert organic solvent.

7. A process according to claim 5 wherein said inert organic solvent is at least one member selected from the group consisting of aliphatic hydrocarbons, alicyclic hydrocarbons, aromatic hydrocarbons, and cyclic ethers.

8. A process according to claim 6 wherein said inert organic solvent is xylene.

9. A process according to claim 6 wherein said inert organic solvent is toluene.

10. Process as claimed in claim 1 wherein said initiator is added as sodium metal.

11. Process as claimed in claim 1 wherein said initiator is added as sodium hydride.

12. Process as claimed in claim 1 wherein said initiator is added as a Grignard reagent.

13. Process as claimed in claim 1 including the introduction into said admixture of about 0.001 to 2 mole percent based on said lactam of at least one compound, as a promotor, selected from this group consisting of N-acetyl caprolactam and N-methyl phthalimides.

References Cited

UNITED STATES PATENTS

| | | | |
|---|---|---|---|
| 2,071,250 | 2/1937 | Carothers | 260—78 |
| 3,017,391 | 1/1962 | Mottus et al. | 260—78 |
| 3,021,309 | 2/1962 | Cox (1) | 260—78.3 |
| 3,021,310 | 2/1962 | Cox (2) | 260—78.3 |
| 3,021,314 | 2/1962 | Cox (3) | 260—78.3 |
| 3,021,316 | 2/1962 | Cox (4) | 260—78.3 |
| 3,021,317 | 2/1962 | Cox (5) | 260—78.3 |
| 2,786,045 | 3/1957 | Chirtel et al. | 260—78 |
| 3,033,826 | 5/1962 | Kibler et al. (1) | 260—78 |
| 3,033,827 | 5/1962 | Kibler et al. (2) | 260—78 |
| 3,268,486 | 8/1966 | Klootwijk | 260—78 |

HAROLD D. ANDERSON, Primary Examiner

U.S. Cl. X.R.

260—30.8, 32.6, 33.4